United States Patent Office 3,475,443
Patented Oct. 28, 1969

3,475,443
3-PYRIDYL-5-PYRIDOYLAMINO-ISOXAZOLES
Paul Schmidt and Kurt Eichenberger, Therwil, and Max Wilhelm, Allschwil, Switzerland, assignors to Ciba Corporation, New York, N.Y., a corporation of Delaware
No Drawing. Filed June 5, 1967, Ser. No. 643,406
Claims priority, application Switzerland, June 9, 1966, 8,359/66; Mar. 14, 1967, 3,659/67
Int. Cl. A61k *27/00*; C07d *31/40*
U.S. Cl. 260—295
19 Claims

ABSTRACT OF THE DISCLOSURE

New compounds of the formula:

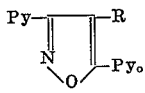

Py=optionally substituted pyridyl radical.
Py_o=optionally substituted pyridoyl radical.
R=hydrogen or substituent, such as alkyl, halogen.

For example 3-(4-pyridyl)-5-(4-pyridoylamino)-isoxazole. Use: anti-inflammatory agents.

BACKGROUND OF THE INVENTION

The invention concerns new 3-pyridyl-5-(pyridoylamino)-isoxazoles and their preparation, which have not been heretofore disclosed in the literature and which have been found to have valuable anti-inflammatory properties.

SUMMARY OF THE INVENTION

The present invention relates to new isoxazoles. Especially it concerns isoxazoles that contain in position 5 a pyridoylamino residue and in position 3 a pyridyl residue, pharmaceutical compositions thereof, as well as their manufacture. They are valuable antiphlosistic agents in mammals.

DESCRIPTION OF THE PREFERRED EMBODIMENTS

In the compounds of the invention the pyridyl radical may be a 2-, 3- or 4-pyridyl residue and the pyridoyl residue may be a 2-, 3- or 4-pyridoyl residue. The pyridyl and pyridoyl residues may be unsubstituted or contain one or several substituents. Particularly suitable substituents are alkyl radicals or halogen atoms.

The alkyl radicals are preferably lower alkyl radicals, especially methyl, ethyl, propyl or isopropyl or linear or branched butyl or pentyl radicals bound in any desired position.

Particularly suitable halogen atoms are chlorine or bromine atoms.

The isoxazole nucleus may be unsubstituted or substituted in position 4, for example by alkyl radicals such as those mentioned above, or by halogen atoms, for example chlorine or bromine atoms.

The imino group which connects the 5-position of the isoxazole nucleus with the pyridoyl residue may be unsubstituted or substituted, for example by alkyl radicals such as those mentioned above.

The new compounds possess valuable pharmacological properties. More especially, they display inter alia an anti-inflammatory activity as can be shown in animal tests, for example on the rat. The new compounds are therefore useful as anti-phlogistics. The new compounds are also valuable intermediates for the manufacture of other useful substances, especially pharmacologically active compounds. Particularly valuable are the compounds of the formula:

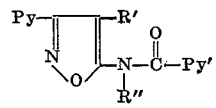

where Py and Py' represents unsubstituted 2-, 3- or 4-pyridyl residues; R' represents a lower alkyl radical, a chlorine or bromine atom or especially a hydrogen atom, and R" stands for a lower alkyl radical or preferably for a hydrogen atom—and more especially the 3-(4-pyridyl)-5-(4-pyridoylamine)-isoxazole, 3 - (4-pyridyl)-5-(3-pyridoylamino)-isoxazole and above all the 3-(3-pyridyl)-5-(3-pyridoylamino)-isoxazole which, for instance in the rat, on oral administration of a dose from 300 to 500 mg./kg. produces a pronounced anti-inflammatory effect.

The new compounds are prepared according to known methods.

Preferably, an isoxazole containing in position 5 an amino group with at least one hydrogen atom and in position 3 a pyridyl residue is reacted with a halide, especially the chloride, of a pyridinecarboxylic acid.

The reaction follows the usual practice. It is preferably conducted in the presence of a condensing agent and/ or a catalyst, for example in the presence of an acid acceptor, for example an organic or inorganic base such as pyridine or an alkali metal carbonate or acetate, preferably in the presence of a solvent and/or diluent, at room temperature or with cooling or heating, under atmospheric or superatmospheric pressure.

Substituents present in a resulting compound may be converted to suit the definition of the final products given above. Thus, the isoxazole nucleaus in 4-position in a resulting compound may be halogenated in the usual manner, for example it may be chlorinated or brominated, for instance with chlorine or bromine.

The invention further includes any modification of the present process in which an intermediate obtainable at any stage of the process is used as starting material and any remaining step/steps is/are carried out, or in which a starting material is formed under the reaction conditions, or in which reactants may be used in the form of their salts.

The reaction of this invention are preferably carried out with starting products that give rise to the abovementioned preferred compounds.

The starting materials are known or, if they are new, can be prepared in known manner. The 5-amino-3-pyridyl-isoxazoles and their salts used as starting materials are obtained in known manner, for example by reacting hydroxylamine upon a suitable pyridoylacetonitrile.

The new compounds may be used, for example in the form of pharmaceutical preparations containing them in conjunction or admixture with an organic or inorganic, solid or liquid excipient suitable for enteral, parenteral or local administration. Suitable excipients are substances that do not react with the new compounds for example water, gelatin, lactose, starches, stearyl alcohol, magnesium stearate, talcum, vegetable oils, benzyl alcohols, gums, propyleneglycols, white petroleum jelly, cholesterol or other known medicinal excipients. The pharmaceutical preparations may be, for example, tablets, dragees, capsules, suppositories, ointments or creams, or in liquid form solutions (e.g. elixirs or syrups) suspensions or emulsions. They may be sterilized and/or contain assistants such as preserving, stabilizing, wetting or emulsifying agents, solution promotors, salts for regulating the osmotic pressure or buffers. They may further contain other therapeutically valuable substances. The pharmaceutical preparations are formulated in the usual way.

The new compounds may also be used in the form of feeding stuffs or additives to feedings stuffs, using, for example, the conventional extenders and diluents or feedingstuffs respectively.

The following examples illustrate the invention without restricting its scope.

Example 1

7 grams of isonicotinic acid chloride are added to a solution of 8 g. of 3-(4-pyridyl)-5-amino-isoxazole in 60 ml. of pyridine, whereupon a crystalline product settles out. The whole is left to itself for 20 minutes; then the reaction product is introduced in 300 ml. of water and adjusted to a pH value of about 8 by means of sodium bicarbonate. The crystals are suctioned off and recrystallized from dimethylformamide, to yield the 3-(4-pyridyl)-5-(4-pyridoylamino)-isoxazole of the formula:

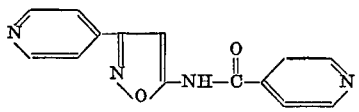

melting at 312 to 314° C.

Example 2

7.7 grams of nicotinic acid chloride are added to a solution of 8 g. of 3-(4-pyridyl)-5-amino-isoxazole in 60 ml. of pyridine. The batch is kept for 2 hours and then poured into 400 ml. of water. The crystals are suctioned off and recrystallized from dimethylformamide, to yield the 3-(4-pyridyl)-5-(3-pyridoylamino)-isoxazole of the formula:

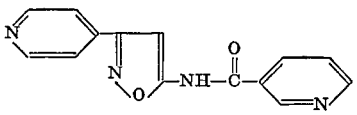

melting at 253 to 254° C.

Example 3

A solution of 15.5 g. of 2-pyridinecarboxylic acid chloride in 400 ml. of petroleum ether is stirred into a solution of 16.1 g. of 3-(4-pyridyl)-5-amino-isoxazole in 300 ml. of pyridine, and the mixture is stirred on for 10 minutes at room temperature. The precipitated crystals are suctioned off and thoroughly washed with acetone and water. Recrystallization from dioxanedimethyl-formamide furnishes the 3-(4-pyridyl)-5-(2-pyridoylamino)-isoxazole of the formula:

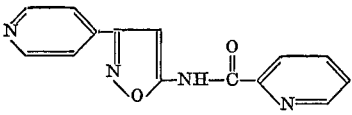

melting at 245 to 247° C.

Example 4

11.7 grams of isonicotinoylchloride are added to a solution of 12 g. of 3-(3-pyridyl)-5-amino-isoxazole in 100 ml. of pyridine. The mixture is left to itself for one hour and then poured into 400 ml. of water. The precipitated crystals are suctioned off, washed with water and recrystallized from dimethylformamide, to yield the 3-(3-pyridyl)-5-(pyridoylamino)-isoxazole of the formula:

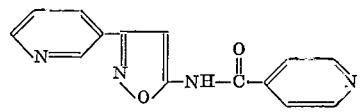

melting at 259 to 260° C.

The 3-(3-pyridyl)-5-amino-isoxazole used as starting material can be prepared in the following manner:

500 ml. of absolute ethanol is slowly dropped into 46 g. of sodium in 1.5 litres of boiling toluene. When the sodium has dissolved, the whole is distilled until its boiling point rises to 91° C. The reaction solution is then allowed to cool to 90° C., 200 g. of nicotinic acid ethyl ester and 120 g. of acetonitrile are added, and the whole is refluxed for 7 hours, then allowed to cool, mixed with water and the toluene layer is isolated. On addition of 280 ml. of 6.34 N-hydrochloric acid to the aqueous phase the nicotinoylacetonitrile of the formula:

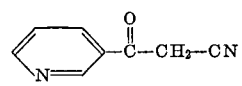

melting at 76 to 78° C., settles out.

A solution of 43.8 g. of nicotinoyl-acetonitrile in 150 ml. of 2 N-sodium hydroxide solution is mixed with a solution of 41.7 g. of hydroxylamine hydrochloride in 300 ml. of 2 N-sodium hydroxide solution. After 20 hours' standing the 3-(3-pyridyl)-5-amino-isoxazole of the formula:

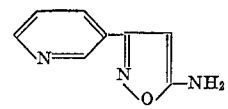

melting at 176 to 179° C. settles out.

Example 5

7.7 grams of nicotinoylchloride are added to a warm solution of 8 g. of 3-(3-pyridyl)-5-amino-isoxazole in 70 ml. of pyridine, and the whole is heated for 10 minutes on a water bath, allowed to cool and stirred into 400 ml. of water. The crystals are suctioned off and recrystallized from dioxane, to yield the 3-(3-pyridyl)-5-(3-pyridoylamino)-isoxazole of the formula:

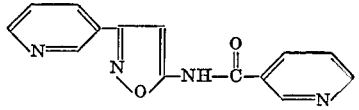

melting at 252 to 253° C.

Example 6

A solution of 15.5 g. of 2-pyridinecarboxylic acid chloride in 400 ml. of petroleum ether is stirred into a solution of 16.1 g. of 3-(3-pyridyl)-5-amino-isoxazole in 300 ml. of pyridine. The batch is further stirred for 15 minutes at room temperature. The precipitated crystals are suctioned off and washed with acetone and water. Recrystallization from dioxane furnishes the 3-(3-pyridyl)-5-(2-pyridoylamino)-isoxazole of the formula:

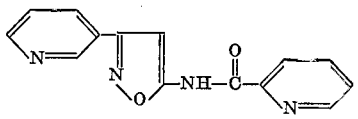

melting at 214 to 216° C.

Example 7

A solution of 8 g. of 3-(2-pyridyl)-5-amino-isoxazole in 70 ml. of pyridine is mixed with 7.7 g. of isonicotinoylchloride, and the whole is heated for 10 minutes on a water-bath, allowed to cool and then stirred into 400 ml.

of water. The precipitated crystallizate is suctioned off, washed with water and recrystallized from dimethylformamide, to yield the 3-(2-pyridyl)-5-(4-pyridoylamino)-isoxazole of the formula:

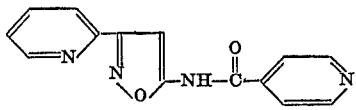

melting at 211 to 212° C.

Example 8

A solution of 8.4 g. of 3-(2-pyridyl)-5-amino-isoxazole in 40 ml. of pyridine is mixed with 8.1 g. of nicotinoylchloride and allowed to cool. The precipitated crystals are suctioned off and recrystallized from dimethylformamide, to yield the 3-(2-pyridyl)-5-(3-pyridoylamino)-isoxazole of the formula:

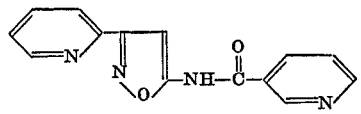

melting at 230° C. with decomposition.

Example 9

A solution of 10 g. of 2-pyridinecarboxylic acid chloride in 250 ml. of petroleum ether is dropped into a solution of 10.5 g. of 3-(2-pyridyl)-5-amino-isoxazole in 750 ml. of benzene and 5.2 ml. of pyridine. The batch is stirred for 1½ hours at room temperature and then evaporated. The residue is stirred with saturated sodium bicarbonate solution; the crystals are suctioned off and recrystallized from alcohol, to yield the 3-(2-pyridyl)-5-(2-pyridoylamino)-isoxazole of the formula:

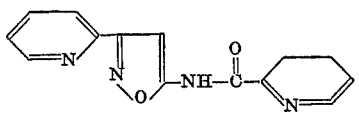

melting at 190° C. with decomposition.

Example 10

15.5 g. of isonicotinoylchloride are added to a warm solution of 17.5 g. of 3-(4-pyridyl)-4-methyl-5-amino-isoxazole in 150 ml. of pyridine. After 10 minutes, the batch is evaporated to dryness. The residue is stirred with water, the crystals are filtered off with suction, and recrystallized from ethanol. There is obtained 3-(4-pyridyl)-4-methyl-5-(4-pyridoylamino)-isoxazole of the formula:

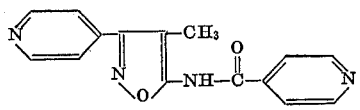

melting at 228° C.

The 3-(4-pyridyl)-4-methyl-5-amino-isoxazole used as starting material can be prepared as follows:

A solution, prepared from 69 g. of hydroxylamine hydrochloride and 500 ml. of 2 N-sodium hydroxide solution is added to a solution of 80 g. of α-(4-pyridoyl)-propionitrile in 500 ml. of N-sodium hydroxide solution. The batch is allowed to stand for three hours before the precipitated crystals are filtered off with suction and washed until neutral. There is obtained in this manner 3-(4-pyridyl)-4-methyl-5-amino-isoxazole of melting point 198–200° C.

Example 11

11.6 g. of nicotinoylchloride are added to a solution of 13.1 g. of 3-(4-pyridyl)-4-methyl-5-amino-isoxazole in 100 ml. of pyridine. The batch is then evaporated to dryness. The residue is triturated with water, the crystals are filtered off with suction and recrystallized from ethanol.

There is obtained in this manner 3-(4-pyridyl)-4-methyl-5-(3-pyridoylamino)-isoxazole of the formula:

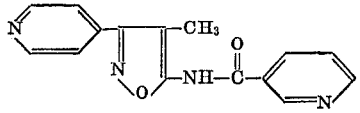

melting at 190–192° C.

Example 12

15.5 g. of 2-pyridine-carboxylic acid chloride are added to a suspension of 17.5 g. of 3-(4-pyridyl)-4-methyl-5-amino-isoxazole. The batch is allowed to stand for 10 minutes, then diluted with water while cooling, and the crystals that have precipitated are filtered off with suction. On recrystallization from chloroform+petroleum ether and sublimation, 3-(4-pyridyl)-4-methyl-5-(2-pyridoylamino)-isoxazole of the formula:

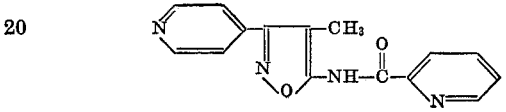

is obtained which melts at 210°–212° C.

Example 13

5.1 g. of isonicotinoylchloride are added to a warm solution of 7.3 g. of 3-(4-pyridyl)-4-bromo-5-amino-isoxazole in 50 ml. of absolute pyridine and the batch allowed to stand at room temperature for 1 hour. The reaction solution is then poured into water and the crystals that precipitate are filtered off with suction. On being reprecipitated with hydrochloric acid from sodium hydroxide solution and recrystallized from aqueous ethanol, they yield 3-(4-pyridyl)-4-bromo-5-(4-pyridoylamino)-isoxazole of the formula:

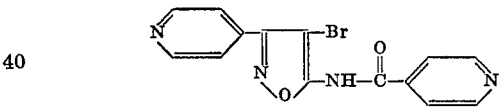

melting at 210–211° C.

The 3-(4-pyridyl)-4-bromo-5-amino-isoxazole used as starting material can be prepared as follows:

A solution of 8 g. of bromine in 135 ml. of glacial acetic acid is added dropwise while stirring to 8.05 g. of 3-(4-pyridyl)-5-amino-isoxazole in 80 ml. of glacial acetic acid. When the dropwise addition is finished, the batch is treated with ether, and the precipitated crystals are filtered off with suction. They are dissolved in water, and the aqueous solution is given a pH of 9 with sodium carbonate solution. The batch is then filtered with suction and the filter residue recrystallized from ethanol to obtain 3-(4-pyridyl)-4-bromo-5-amino-isoxazole of melting point 197–199° C. (decomposition).

Example 14

8.5 g. of isonicotinoylchloride are added to a solution of 8.75 g. of 3-(4-pyridyl)-5-(methylamino)-isoxazole in 50 ml. of pyridine. When the reaction has subsided, the batch is concentrated to a great extent, and 200 ml. of water are added. The precipitated material is filtered off with suction and dissolved in chloroform. The chloroformic solution is washed once with water, dried with sodium sulfate, decolorized with carbon, and evaporated. On recrystallization of the residue from ethanol and sublimation, 3-(4-pyridyl)-5-(methyl-4-pyridoylamino)-isoxazole of the formula:

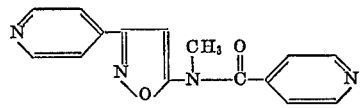

melting at 166–168° C. is obtained.

The 3-(4-pyridyl)-5-(methylamino)-isoxazole used as starting material can be prepared as follows:

30 g. of 3-(4-pyridyl)-5-acetylamino-isoxazole are added to a solution of 3.4 g. of sodium in 150 ml. of absolute ethanol. At room temperature, 7.1 g. of methyliodide in 20 ml. of ethanol are stirred in. After the dropwise addition, stirring is continued for 17 hours. The precipitated material is filtered off with suction, and the filtrate evaporated to dryness. The residue is treated with water, and the crystals filtered off with suction. For purification, the crystals are suspended once more in water, the suspension treated with some sodium hydroxide solution, agitated, and again filtered with suction. On recrystallization from water, 3-(4-pyridyl)-5-(methalamino)-isoxazole of melting point 139–141° C. is obtained.

Example 15

A solution of 1.6 g. of bromine in 10 ml. of glacial acetic acid is added dropwise in the course of 15 minutes to 2.66 g. of 3-(4-pyridyl)-5-(4-pyridoylamino)-isoxazole in 250 ml. of glacial acetic acid. Stirring is continued at room temperature for an hour, the batch then evaporated, the residue treated with saturated sodium bicarbonate solution, and filtered with suction. The material on the filter is recrystallized from 70% aqueous ethanol to obtain 3 - (4 - pyridyl) - 4-bromo-5-(4-pyridoylamino)isoxazole melting at 210–211° C. which is identical with the compound described in Example 13.

Example 16

A solution of 11.5 g. of bromine in 70 ml. of glacial acetic acid is added dropwise, while stirring, to a solution of 19 g. of 3-(3-pyridyl)-5-(3-pyridoylamino)-isoxazole in 500 ml. of glacial acetic acid, and stirring is continued for an hour. The precipitated material is filtered off and the filterate evaporated to dryness. The residue is dissolved in water and neutralized with saturated sodium bicarbonate solution. The precipitated crystals are filtered off with suction and recrystallized from aqueous ethanol to obtain 3-(3-pyridyl)-4-bromo-5-(3-pyridoylamino) - isoxazole of the formula

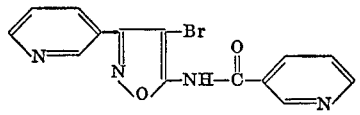

melting at 191–193° C.

Example 17

A solution of 4.8 g. of bromine in 30 ml. of glacial acetic acid is added dropwise at room temperature to a solution of 8 g. of 3-(4-pyridyl)-5-(3-pyridoylamino)-isoxazole in 350 ml. of glacial acetic acid. The batch is then stirred for an hour. The precipitated material is filtered off with suction, dissolved in water, rendered alkaline with sodium bicarbonate, and the crystals filtered off with suction. On recrystallization from ethanol, 3-(4-pyridyl)-4-bromo - 5 - (3-pyridoylamino)-isoxazole of the formula:

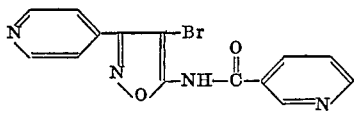

melting at 213–214° is obtained.

From glacial acetic acid mother liquor, some more bromination product can be obtained on evaporation to dryness, dissolving the residue in ethanol, and treating the solution with water.

Example 18

Tablets, each containing 300 mg. of 3-(4-pyridyl)-5-(4-pyridoylamino)-isoxazole, can be prepared, for example, from the following ingredients:

| | Mg. per tablet |
|---|---|
| 3-(4-pyridyl)-5-(4-pyridoylamino)-isoxazole | 300 |
| Lactose | 35 |
| Wheat starch | 45 |
| Colloidal silicic acid | 22 |
| Arrowroot | 24 |
| Talc | 22 |
| Magnesium stearate | 2 |
| | 450 |

Method.—3-(4-pyridyl)-5-(4-pyridoylamino)-isoxazole is mixed with the lactose, part of the wheat starch, and the colloidal silicic acid, and the mixture forced through a sieve. The remainder of the wheat starch is pasted on a water bath with five times its quantity of water, and the powder mixture kneaded with the resulting paste until a slightly plastic mass is obtained. The mass is pressed through a 3 mm. mesh sieve, dried, and the resulting dry granulate passed through a sieve. The arrowroot, the talc and the magnesium stearate are then admixed and the resulting mixture compressed into cross-scored tablets each weighing 450 mg.

We claim:
1. A compound of the formula:

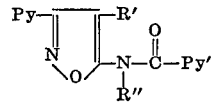

in which Py and Py' each stands for a member selected from the group consisting of pyridyl, mono lower alkylated pyridyl, mono halogenated pyridyl and mono lower alkylated and mono halogenated pyridyl, R' stands for a member selected from the group consisting of hydrogen, lower alkyl and halogen and R" for a member selected from the group consisting of hydrogen and lower alkyl.

2. A compound as claimed in claim 1, wherein Py and Py' each stands for a member selected from the group consisting of 2-pyridyl, 3-pyridyl and 4-pyridyl, R' for a member selected from the group consisting of hydrogen, lower alkyl, chlorine and bromine and R" for a member selected from the group consisting of lower alkyl and hydrogen.

3. A compound as claimed in claim 1, wherein Py and Py' each stands for a member selected from the group consisting of 2-pyridyl, 3-pyridyl and 4-pyridyl and R' and R" each stands for a hydrogen atom.

4. A compound as claimed in claim 1, which compound is 3-(4-pyridyl)-5-(4-pyridoylamino)-isoxazol.

5. A compound as claimed in claim 1, which compound is 3-(4-pyridyl)-5-(3-pyridoylamino)-isoxazole.

6. A compound as claimed in claim 1, which compound is 3-(3-pyridyl)-5-(3-pyridoylamino)-isoxazole.

7. A compound as claimed in claim 1, which compound is 3-(4-pyridyl)-5-(2-pyridoylamino)-isoxazole.

8. A compound as claimed in claim 1, which compound is 3-(3-pyridyl)-5-(4-pyridoylamino)-isoxazole.

9. A compound as claimed in claim 1, which compound is 3-(3-pyridyl)-5-(2-pyridoylamino)-isoxazole.

10. A compound as claimed in claim 1, which compound is 3-(2-pyridyl)-5-(4-pyridoylamino)-isoxazole.

11. A compound as claimed in claim 1, which compound is 3-(2-pyridyl)-5-(3-pyridoylamino)-isoxazole.

12. A compound as claimed in claim 1, which compound is 3-(2-pyridyl)-5-(2-pyridoylamino)-isoxazole.

13. A compound as claimed in claim 1, which compound is 3-(4-pyridyl)-4-methyl-5-(4-pyridoylamino)-isoxazole.

14. A compound as claimed in claim 1, which compound is 3-(4-pyridyl)-4-methyl-5-(3-pyridoylamino)-isoxazole.

15. A compound as claimed in claim 1, which compound is 3-(4-pyridyl)-4-methyl-5-(2-pyridoylamino)-isoxazole.

16. A compound as claimed in claim 1, which compound is 3-(4-pyridyl)-5-(methyl-4-pyridoylamino)-isoxazole.

16. A compound as claimed in claim 1, which compound is 3-(4-pyridyl)-5-(methyl-4-pyridoylamino)-isoxazole.

17. A compound as claimed in claim 1, which compound is 3-(4-pyridyl)-4-bromo-5-(4-pyridoylamino)-isoxazole.

18. A compound as claimed in claim 1, which compound is 3-(3-pyridyl)-4-bromo-5-(3-pyridoylamino)-isoxazole.

19. A compound as claimed in claim 1, which compound is 3-(4-pyridyl)-4-bromo-5-(3-pyridoylamino)-isoxazole.

References Cited

UNITED STATES PATENTS 3,277,105  10/1966  Schmidt et al. _____ 260—295

HENRY R. JILES, Primary Examiner

A. L. ROTMAN, Assistant Examiner

U.S. Cl. X.R.

260—294.9, 295.5, 307; 424—266